United States Patent [19]

Wideman et al.

[11] Patent Number: 4,996,258

[45] Date of Patent: Feb. 26, 1991

[54] HYDROFORMYLATED THERMAL OILS

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 402,407

[22] Filed: Sep. 5, 1989

[51] Int. Cl.$^5$ .............................................. C08L 93/04
[52] U.S. Cl. .................................. 524/274; 530/210; 530/223; 530/226; 530/227
[58] Field of Search ................ 524/274; 530/210, 226, 530/227, 223

[56] References Cited

U.S. PATENT DOCUMENTS

| | | | |
|---|---|---|---|
| 2,891,024 | 6/1959 | Putnam | 530/223 |
| 2,906,745 | 9/1959 | Levering | 530/223 |
| 4,324,710 | 4/1982 | Davis et al. | 524/76 |
| 4,419,470 | 12/1983 | Davis et al. | 524/76 |
| 4,478,993 | 10/1984 | Wideman | 527/600 |
| 4,515,713 | 5/1985 | Wideman et al. | 530/220 |

OTHER PUBLICATIONS

D. R. Levering and A. L. Glasebrook—*Oxonation of Rosin*—Ind. & Eng. Chem., vol. 50, No. 3, pp. 317–322 (Mar. 1958).

Proceedings of the Conference on Naval Stores Products (Adhesives, Tackifiers & Related Materials) held at New Orleans, La.—May 15, 1969, U.S. Dept. of Agriculture, Agricultural Research Service—Pub. No. 72-77 (Nov. 1969) pp. 3, 7, 8, 17, 18, 28, 32, 33.

*Primary Examiner*—Veronica P. Hoke
*Attorney, Agent, or Firm*—Bruce J. Hendricks

[57] ABSTRACT

The present invention relates to a hydroformylated thermal oil which is useful as a total or partial replacement for extender or processing oil in rubber formulations. The hydroformylated thermal oil is prepared by reacting decarboxylated rosin acid with carbon monoxide and hydrogen under hydroformylation conditions in the presence of a hydroformylation catalyst and organic reaction solvent.

18 Claims, No Drawings

HYDROFORMYLATED THERMAL OILS

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids*, L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,478,993 discloses the use of decarboxylated rosin acid also known as thermal oil as a total or partial replacement for oil in a rubber formulation. Compared with the use of aromatic extending oils in rubbers, decarboxylated rosin acids provide comparable processing and low temperature performance and superior abrasive resistance. Unfortunately, use of decarboxylated rosin acid does not benefit the vulcanizate properties related to ozone resistance, flex, tensile, elongation and rebound. These properties are typically improved by the supplemental addition of a multitude of additives. The cost of compounding all these additives as well as the potential and detrimental interaction of these additives is preferably avoided. Therefore, there is a need for a single additive which can improve a number of properties while decreasing the cost and detrimental interaction by the addition of a multitude of compounds.

SUMMARY OF THE INVENTION

The present invention relates to a hydroformylated thermal oil prepared according to a process comprising reacting decarboxylated rosin acid with carbon monoxide and hydrogen under hydroformylation conditions in the presence of a hydroformylation catalyst and organic reaction solvent. Use of the hydroformylated thermal oil in a rubber vulcanizate improves the rebound, elongation, ozone resistance and flex in the vulcanizate.

DETAILED DESCRIPTION OF THE INVENTION

There is disclosed a process for preparing rubber compositions which comprises admixing a rubber selected from the group consisting of natural rubber, homopolymers of conjugated diolefins, copolymers of conjugated diolefins and ethylenically unsaturated monomers or mixtures thereof with hydroformylated thermal oils.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and a hydroformylated thermal oil prepared according to a process comprising reacting decarboxylated rosin acid with carbon monoxide and hydrogen under hydroformylation conditions in the presence of a hydroformylation catalyst and organic reaction solvent.

The hydroformylated thermal oil is prepared from decarboxylated rosin acid. The decarboxylated rosin acid may be prepared in accordance with the teachings of U.S. Pat. No. 4,515,713, incorporated by reference herein in its entirety. The decarboxylated rosin acid may be prepared by heating rosin acids to a temperature from 300° C. to 450° C. in the presence of at least one decarboxylation accelerator. The decarboxylated rosin acid may also be derived from resin acids and Pinex TM rosin.

Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex TM rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. Examples of the rosin acids are abietic, levopimaric, neoabietic, palustric, dehydroabietic, tetrahydroabietic, pimaric, isopimaric, Δ-isopimaric, elliotinoic, sandaracopimaric or mixtures thereof. Over the years nomenclature of individual acids has changed. IUPAC nomenclature names resin acids as derivatives of abietane. The two major rosin acid components are abietic acid having the following structural formula. The following is a structural formula for abietic acid:

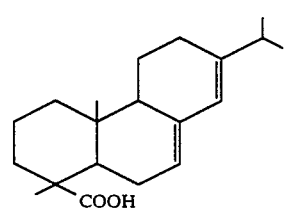

and dehydroabietic acid, having the structural formula:

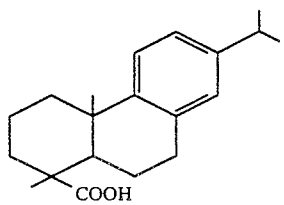

Accelerators that can be used to form the decarboxylated rosin acid include high sulfur content tall oil rosin, thermoplastic resin (Vinsol TM resin), fatty acids, organic sulfides and inorganic sulfides. Specific examples of suitable accelerators include organic sulfides such as diphenyl sulfide, benzyl phenyl sulfide, ditolyl sulfide, dinaphthyl sulfide, diheptyl sulfide, diisoamyl sulfide and organic sulfides that have boiling points greater than 250° C.; inorganic sulfides such as sodium sulfide, potassium sulfide, lithium sulfide, magnesium sulfide, calcium sulfide, zinc sulfide, iron sulfide and inorganic sulfides of metals that are compatible with rubber and polymeric systems: fatty acids such as stearic acid, oleic acid, linoleic acid, palmitic acid, lauric acid, nonanoic acid and fatty acids that have boiling points greater than 250° C.

Some thermoplastic resins which are useful as accelerators in preparing the decarboxylated rosin acid are dark materials derived from crude wood rosin. Crude wood rosin is the product remaining after a solvent extract of pine wood chips has been separated into recovered solvent, turpentine, pine oil, and other terpenes. The crude wood rosin is separated into a pale rosin and a resinous fraction containing the dark colored material. It is from this dark resinous material that an accelerator useful in the decarboxylation of a rosin acid of the present invention is derived. A specific example of a thermoplastic resin is Vinsol TM, manufactured by Hercules Corporation, which has a softening point of approximately 100° C. to about 130° C. (Hercules drop method), and an acid number of about 95. The thermoplastic resins are soluble in most polar solvents but insoluble in water, aliphatic hydrocarbon solvents, fats and oils. The thermoplastic resins can be described as a complex mixture of high molecular weight phenolic compounds, resin acids, neutral materials, and several minor components. The acid number can generally range from about 40 to about 105, and preferably from about 90 to about 105, with the softening point ranging from about 110° C. to about 130° C. Its constituents include high molecular weight phenols, carboxyl-substituted phenols, substituted phenyl ethers, and polyphenols. It contains acidic materials derived from resin acids and oxidized resin acids. High molecular weight neutral compounds are present such as polymerized terpenes and natural waxes. Naturally, the material can vary from pine tree grove to pine tree grove, as well as from area of country to area of country, as well as from type of particular recovery process utilized, and the like.

The acid number for the decarboxylated rosin acid may vary. Generally this acid number ranges from about 2 to about 62. Preferably the acid number is below 50 with a range of from about 4 to about 36 being particularly preferred.

The decarboxylated rosin acid is subjected to hydroformylation conditions while in the presence of a mixed gas composed of carbon monoxide and hydrogen. Such gas is commonly known as water gas, syngas or oxo gas. The relative amounts of carbon monoxide and hydrogen which are initially present in the feed gas to the reactor may be varied over a wide range. In general, the mole ratio of carbon monoxide to hydrogen is in the range of between about 30:1 to about 1:30, preferably between about 15:1 and about 1:15 and most preferably between about 10:1 to about 1:10. It is to be understood, however, that molar ratios outside the stated broad range may be employed. In addition to hydrogen and carbon monoxide, other gases may be contained in the feed gas so long as they do not or are not present in sufficient amounts to detrimentally affect the hydroformylation reaction.

An organic solvent is used to dissolve the decarboxylated rosin acid and the hydroformylation catalyst. The solvent is preferably inert to the hydroformylation reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the decarboxylated rosin acid and dissolve the hydroformylation catalyst and not interfere with the hydroformylation reaction.

The hydroformylation of the decarboxylated rosin acid is conducted in the presence of a hydroformylation catalyst. Conventional hydroformylation catalysts may be used including Group VIII Noble metal-triarylphosphine complex catalysts. Group VIII Noble metal-triarylphosphine complex catalysts are prepared using Group VIII Noble metal compounds, for example, hydrides, halides, carboxylates, nitrates or sulfates, etc. and triarylphosphine by known processes. The complex may be previously prepared from the Group VIII Noble metal compound and triarylphosphine and then introduced to the reaction system. The Group VIII Noble compound and the triarylphosphine may also be supplied to the reaction system separately to form the complex in the reaction system. Examples of the Group VIII Noble metal compounds that can be used for preparing the complexes include ruthenium compounds such as ruthenium trichloride or tetraminoruthenium hydroxychloride, etc.; rhodium compounds such as rhodium dicarboxylchloride, rhodium nitrate, rhodium trichloride, rhodium acetate or rhodium sulfate, etc.; palladium compounds such as palladium hydride, palladium chloride, palladium iodide, palladium nitrate, palladium cyanide, palladium acetate or palladium sulfate, etc.; osmium compounds such as osmium trichloride or chloroosmic acid, etc.; iridium compounds such as iridium tribromide, iridium tetrabromide, iridium trifluoride, iridium trichloride or iridium carbonyl, etc.; and platinum compounds such as platinic acid, platinous iodide, sodium hexachloroplatinate, or potassium trichloromonoethyleneplatinate, etc. As the triarylphosphine ligand, triphenylphosphine is most suitably used. However, it is possible to use various triarylphosphines having substituents which are inactive with respect to the hydroformylation reaction, such as, for example, substituted triphenylphosphines having a lower alkyl group on the phenyl group such as tri-p-tolylphosphine, tri-m-tolylphosphine, trixylylphosphine or tris(p-ethylphenyl) phosphine, and substituted triphenylphosphines having an alkoxy group on the phenyl group such as tris(p-methoxyphenyl) phosphine, etc. As is known by those skilled in the art, tertiary phosphines such as triarylphosphine, etc. may be allowed, in general, to coexist in the reaction system in order to improve thermal stability of the complex catalyst. The amount of such coexistence can be in excess of ten times to several hundred times (e.g., about 10 to 900) as a molar ratio, based on the moles of the complex catalyst in the reaction system. Other than the above, the hydroformylation catalyst may be a cobalt compound soluble in the reaction mixture. Particularly preferred cobalt compounds include cobalt hydrocarbonyls or cobalt carbonyls such as dicobalt octacarbonyl. Cobalt carbonyl may be prepared in situ by reaction of the syngas on various cobalt salts.

The amount of catalyst that is generally present may range from a concentration of from about 0.01 to about 2.0% by weight of the reaction mixture. Preferably, the hydroformylation catalyst will range from about 0.05 to about 0.5% by weight of the reaction mixture.

The hydroformylation can be effected over a wide temperature range from moderate to elevated temperature. In general, the hydroformylation reaction may be conducted at a temperature of between about 50° C. to about 400° C. In most cases, when operating at the lower end of the temperature range, it is desirable to utilize pressures at the higher end of the range. The preferred temperature range is from about 90° C. to about 140° C., while the most preferred temperature range is from about 100° C. to about 120° C.

The hydroformylation reaction is effected under superatmospheric pressure conditions. The pressure is produced by the hydrogen and carbon monoxide containing gas provided to the reactor. Pressures between 10 psig to about 2500 psig may be used to conduct the hydroformylation reaction. In the preferred embodiment, the hydroformylation reaction is conducted at a pressure range of from about 50 to about 250 psig. In addition to the partial pressures exerted by carbon monoxide and hydrogen, a partial pressure will be exerted by any inert gases that may be present in the syngas.

The process of this invention is effected for a period of time sufficient to produce the desired hydroformylated thermal oil. In general, the reaction time can vary from minutes to several hours. If the more sluggish reaction conditions are selected, then the reaction time will have to be extended until the desired product is produced. It is appreciated that the residence time of the thermal oil will be influenced by the reaction temperature, concentration and choice of catalyst, total gas pressure, partial pressure exerted by its components, concentration and choice of solvent, and other factors. Desirably, the hydroformylation reaction is conducted until such time as from about 0.1% to about 5% of the thermal oil is functionalized. Preferably, the reaction is conducted until such time as from about 1% to about 2% of the thermal oil is functionalized.

The process for the hydroformylation of decarboxylated rosin acid may be carried out in a batch, semi-continuous or continuous manner. The hydroformylation reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations, or to prevent possible run-away reaction temperatures caused by the possible exothermic nature of the reaction. Preferably, an agitation means is available to ensure the uniform hydroformylation of the decarboxylated rosin acid in the solvent. Mixing induced by vibration, shaker, stirrer, rotating, oscillation, etc. are all illustrative of the types of agitation means which are contemplated for use in the present invention. Such agitation means are available and well known to those skilled in the art.

Addition of the hydroformylated thermal oil to sulfur vulcanizable elastomers enhances many physical properties of the vulcanizate. The term "rubber" or "elastomer" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber: vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the hydroformylated thermal oil are natural rubber, polybutadiene, SBR and polyisoprene.

The present invention finds utility in, for example, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The hydroformylated thermal oil may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of hydroformylated thermal oil that may be added to the rubber may range from about 2 phr (parts per hundred rubber) to about 50 phr. Preferably the amount of hydroformylated thermal oil that is added ranges from about 5 phr to about 35 phr.

The following examples are presented in order to illustrate but not limit the present invention.

EXAMPLE 1

Preparation of Hydroformylated Thermal Oil 100 grams of decarboxylated rosin acid having an acid number of 12 was dissolved in 300 grams of hexane and charged into a 1-liter stainless steel autoclave containing 1 gram of $RhHCO(Ph_3P)_3$ dissolved in 20 ml of toluene. The reactor was flushed with nitrogen and then three times with 100 psig of a syngas ($H_2$: CO mixture in a 1:1 molar ratio). The reactor was pressurized to approximately 100 psig of syngas and heated with stirring to 120°–125° C. and 200 psig total pressure. The reaction was allowed to continue for 30 minutes, cooled and vented. The resulting solution was dried to a constant weight at 80° C. in the vacuum oven. The resulting oil gave an acid number of 11. Infrared spectroscopic analysis showed formation of a carbonyl peak at 1725 cm$^{-1}$ (the carbonyl region) of the spectrum. The amount of modification was determined to be 1% as determined by the amount of syngas consumed in the reaction.

EXAMPLE 2

Preparation of Hydroformylated Thermal Oil 100 grams of decarboxylated rosin acid having an acid number of 12 was dissolved in 300 grams of hexane and charged into a 1-liter stainless steel autoclave containing 340 milligrams of cobaltous naphthenate dissolved in 20 grams of hexane. The reactor was swept with nitrogen and pressurized to a total pressure of 200 psig with a syngas ($H_2$:CO mixture in a 1:1 molar ratio) and heated with stirring to 120°–125° C. The reaction was allowed to continue for 30 minutes. The solution was cooled and the hexane was removed in a draft oven at 60° C. The hydroformylated thermal oil was dried in a vacuum oven for 16 hours at 100° C. Infrared spectroscopic analysis showed formation of a carbonyl peak at 1725 cm$^{-1}$.

EXAMPLES 3–6

Preparation of Hydroformylated Thermal Oil

The reaction conditions and procedure of Example 2 were repeated except decarboxylated rosin acids having acid numbers of 4, 26, 36 and 58 were hydroformylated with 100 milligrams of cobalt carbonyl catalyst.

EXAMPLES 7–9

Rubber compositions containing the materials set out in Table I were prepared in a BR Banbury using two separate stages of addition. The sulfur and accelerators were added to the compounds during the second stage of mixing. The petroleum based processing oil, thermal oil or hydroformylated thermal oil were added to the Banbury during the first stage of mixing. The petroleum based processing oil is a mixture of naphthenic and paraffinic oils. The decarboxylated rosin acid has an acid number of 14 and the hydroformylated thermal oil was prepared in accordance with Examples 3–6.

Table II sets out the cure behavior and vulcanizate properties of rubber compounds containing the various processing oils. The cure behavior and original stress strain properties are similar for all compounds. After air oven or nitrogen bomb aging, the decarboxylated rosin acid and hydroformylated thermal oil are superior to the petroleum based processing oil. Both tensile strength and elongation at break value remain higher. The hydroformylated thermal oil shows some evidence of being slightly better than the decarboxylated rosin acid. The hot rebound of the hydroformylated thermal oil compound is highest with the petroleum based oil being the lowest.

EXAMPLES 10–11

A rubber composition containing the materials set out in Table III was prepared in a BR Banbury, using two separate stages of addition. The sulfur and accelerators were added to the compounds during the second stage of mixing. The petroleum based processing oil and the hydroformylated thermal oil were added to the Banbury during the first stage of mixing. The petroleum based processing oil is a mixture of naphthenic and paraffinic oils. The hydroformylated thermal oil was prepared in accordance with Example 2.

Table IV sets out the cure behavior and vulcanizate properties of the rubber compounds. The cure behavior is similar for both compounds. The hydroformylated thermal oil containing compound exhibits higher modulus and lower tensile strength and elongation at break. The rebound value for the hydroformylated thermal oil compound is higher than the control and shows superior ozone resistance, both static and dynamic, when compared to the petroleum based processing oil containing compound. The higher stress strain modulus of the compound would predict inferior ozone resistance instead of improved.

EXAMPLES 12–17

Rubber compositions containing the material set out in Table III were prepared in a BR Banbury using two separate stages of addition. The sulfur and accelerator were added to the Banbury in the second stage, whereas the processing oils were added to the first stage of mixing. The petroleum based processing oil was a mixture of naphthenic and paraffinic oils. The decarboxylated rosin acid had an acid number of 12 and the hydroformylated thermal oils were prepared in accordance with Examples 3–6.

Table V sets out the cure behavior and vulcanizate properties of the rubber compounds. The cure behavior and stress strain properties are similar for all compounds with the exception of an increasing trend of 300% modulus as the acid number of the hydroformylated thermal oil was increased. Rebound values are similar for all compounds. Static ozone resistance shows that the decarboxylated rosin acid compound is slightly inferior to processing oil compound, whereas the hydroformylated thermal oils are better than the control. The cyclic ozone shows again that the decarboxylated rosin acid is inferior to the petroleum based processing oil, whereas the hydroformylated thermal oils provide equal to better ozone resistance than the control. A trend of improved ozone resistance with increasing acid number for the hydroformylated thermal oils is evident. The pierced Demattia flex results show decarboxylated rosin acid to be better than the control and the lowest acid number hydroformylated thermal oil to also be better, whereas the higher acid number hydroformylated thermal oils are inferior. These results on ozone resistance and flex fatigue or cut growth are totally unexpected.

TABLE I

| Material | Wt. Parts | Banbury Stage |
|---|---|---|
| Shell 901 TM [1] | 50.0 | 1 |
| Natsyn 2200 TM [2] | 50.0 | 1 |
| GPT Carbon Black | 45.0 | 1 |
| Processing Oil | 9.0 | 1 |
| Antioxidant | 3.0 | 1 |
| Fatty Acids | 3.0 | 1 |
| Wax | 1.0 | 1 |
| Zinc Oxide | 3.0 | 1 |
| Accelerators | 1.2 | 2 |
| Sulfur | 1.6 | 2 |

[1] A solution styrene butadiene rubber which has a styrene content of 23.5% by weight and is commercially available from Shell Oil Company of Houston, Texas.
[2] A polyisoprene rubber commercially available from The Goodyear Tire & Rubber Company of Houston, Texas.

TABLE II

Cure Behavior and Vulcanizate Properties

| Rheometer 150° C. | Petroleum Oil | Thermal Oil | Hydroformylated Thermal Oil |
|---|---|---|---|
| Max. Torque | 34.5 | 34.8 | 35.1 |
| Min. Torque | 7.7 | 7.8 | 8.1 |
| Δ Torque | 27.8 | 27.0 | 27.0 |
| t90, minutes | 18.3 | 19.4 | 18.3 |
| t25, minutes | 7.8 | 8.1 | 7.3 |
| Stress Strain (original samples) | | | |
| Tensile Strength (MPa) | 24.0 | 23.4 | 23.2 |
| Elongation at Break (%) | 629 | 627 | 620 |
| 300% Modulus (MPa) | 8.3 | 8.1 | 7.9 |
| Stress Strain (Air aged 7 days at 70° C.) | | | |
| Tensile Strength (MPa) | 22.6 | 23.0 | 24.0 |
| Elongation at Break (%) | 538 | 548 | 562 |
| 300% Modulus (MPa) | 10.3 | 10.7 | 10.6 |
| Stress Strain (Air aged 2 days at 100° C.) | | | |
| Tensile Strength (MPa) | 13.8 | 15.0 | 15.2 |
| Elongation at (Break %) | 313 | 351 | 348 |
| 300% Modulus (MPa) | | | |
| Stress Strain (Nitrogen aged 5 days at 121° C.) | | | |
| Tensile Strength | 13.6 | 15.2 | 15.6 |
| Elongation at Break (%) | 359 | 378 | 390 |
| 300% Modulus (MPa) | 10.8 | 11.4 | 11.0 |
| Rebound (%, 100° C.) (ASTM D1054) | 64.9 | 65.2 | 66.0 |

TABLE III

| Material | Wt Parts | Banbury Stage |
|---|---|---|
| Natural Rubber | 40.0 | 1 |
| BUD 1207 ®[3] | 60.0 | 1 |
| FEF Carbon Black | 50.0 | 1 |
| Processing Oil | 5.0 | 1 |
| Antiozonant | 3.0 | 1 |
| Antioxidant | 1.0 | 1 |
| Rosin/Fatty Acids | 3.0 | 1 |
| Wax | 1 5. 1 | |
| Zinc Oxide | 3.0 | 1 |
| Tackifier | 4.0 | 1 |
| Sulfur/Accelerator | 2.85 | 2 |

[3] A high cis polybutadiene rubber commercially available from The Goodyear Tire & Rubber Company.

TABLE IV

Cure Behavior and Vulcanizate Properties

| Rheometer 150° C. | Petroleum Oil | Hydroformylated Thermal Oil |
|---|---|---|
| Max. Torque | 33.3 | 34.0 |
| Min.Torque | 9.4 | 9.6 |
| Δ Torque | 23.9 | 24.4 |
| t90, minutes | 23.5 | 23.5 |
| t25, minutes | 8.0 | 8.0 |
| Stress Strain | | |
| Tensile Strength (MPa) | 15.1 | 13.9 |
| Elongation at Break (%) | 646 | 562 |
| 300% Modulus (MPa) | 5.8 | 6.3 |
| Rebound (ASTM D1054) 100° C. (%) | 70.0 | 71.5 |
| Static Ozone[1] 25% strain, hours | C3 | A3 |
| Cyclic Ozone[2] 25% Dynamic | | |
| 48 hours | 0* | 0 |
| 236 hours | 1 | 1 |
| 424 hours | 40 | 4 |
| 612 hours | 60 (broken) | 40 |
| DeMattia Flex pierced (.08"), 6 hours flex | .44 inch | .19 inch |

[1] Static
0 = No craking
Number of Cracks
A = very few (less than ¼ surface)
B = few (¼ to ½ surface)
C = Moderate (½ to ¾ surface)
D = Heavy (¾ to all surface)
F = Complete Failure
Size of Cracks
1 = Small (hariline)
2 = Medium
3 = Large
4 = Severe (open)
[2] Cycle D3395 - using a cycled ozone on/off procedure
Density
0 = None
¼ = Edge
1 = ⅛ surface
2 = 0 ¼ surface
3 = ⅜ surface
4 = ½ surface
15 = Broken
Severity
0 = None
1 = .01 in.
3 = 0.3 in.
5 = .10 in.
10 = .25 in.
12 = +.25 in.
*Product of density and severity. Higher values exhibit more severe ozone attack.

TABLE V

Cure Behavior and Vulcanizate Properties

| | Petro. Oil | Thermal Oil | Hydroformulated Thermal Oils | | | |
|---|---|---|---|---|---|---|
| | | | A | B | C | D |
| Acid Number | — | 12.4 | 4 | 26 | 36 | 58 |
| Rheometer (150° C.) | | | | | | |
| Max. Torque | 34.3 | 35.0 | 34.8 | 35.7 | 35.4 | 36.3 |
| Min. Torque | 8.1 | 8.4 | 8.5 | 8.3 | 8.5 | 8.7 |
| Δ Torque | 26.Z | 26.6 | 26.3 | 27.4 | 26.9 | 27.6 |
| t90, minutes | 20.8 | 20.5 | 20.3 | 21.3 | 20.8 | 22.2 |
| t25, minutes | 8.0 | 7.9 | 8.5 | 8.3 | 8.5 | 8.7 |

TABLE-V-continued

Cure Behavior and Vulcanizate Properties

| | Petro. Oil | Thermal Oil | Hydroformulated Thermal Oils | | | |
|---|---|---|---|---|---|---|
| | | | A | B | C | D |
| Stress Strain | | | | | | |
| Tensile Strength (MPa) | 10.9 | 11.1 | 10.8 | 11.1 | 11.2 | 11.6 |
| Elongation at Break (%) | 438 | 436 | 440 | 428 | 438 | 441 |
| 300% Modulus (MPa) | 6.4 | 6.6 | 6.4 | 6.9 | 6.8 | 7.0 |
| Rebound 100° C. (%) | 67.7 | 67.9 | 66.8 | 68.4 | 68.5 | 68.4 |
| Static Ozone 25% Strain | C3 | C4 | C2 | B2 | B2 | B3 |
| Cyclic Ozone | | | | | | |
| 104 hours | 12 | 60 | 12 | 12 | 12 | 12 |
| 152 hours | 60 | — | 60 | 60 | 12 | 12 |
| 248 hours | — | — | — | — | 60 | 60 |
| DeMattia Flex (93° C.) | | | | | | |
| pierced (.08") 6 hours flex | .19" | .08" | .08" | .69" (2 hrs) | 52" | .83" (2 hrs) |

What is claimed is:

1. A hydroformylated thermal oil prepared according to a process comprising reacting decarboxylated rosin acid having an acid number ranging from about 2 to about 62 with carbon monoxide and hydrogen under hydroformylation conditions in the presence of a hydroformylation catalyst and organic reaction solvent for a time sufficient until from about 0.1% to 5% of the decarboxylated rosin acid is functionalized.

2. The hydroformylated thermal oil according to claim 1 wherein the decarboxylated rosin acid is dissolved in the organic solvent.

3. The hydroformylated thermal oil according to claim 1 wherein the hydroformylation catalyst is dissolved in the organic solvent.

4. The hydroformylated thermal oil according to claim 1 wherein the catalyst is a cobalt containing compound.

5. The hydroformylated thermal oil according to claim 1 wherein the catalyst is a Group VIII Nobel metal-triarylphosphine complex and the Group VIII Nobel metal is selected from the group consisting of ruthenium, rhodium, palladium, osmium, iridium and platinum.

6. The hydroformylated thermal oil according to claim 5 wherein the triarylphosphine ligand that is used to prepare the Group VIII Nobel metal-triarylphosphine complex is selected from the group consisting of triphenylphosphine, tri-p-tolylphosphine, tri-m-tolylphosphine, tri-xylylphosphine, tris(p-ethylphenyl)phosphine and tris(p-methoxyphenyl)phosphine.

7. The hydroformylated thermal oil according to claim 4 wherein the cobalt containing compound is selected from the group consisting of cobalt carbonyl or cobalt hydrocarbonyl.

8. The hydroformylated thermal oil according to claim 1 wherein the organic solvent is inert to the hydroformylation reaction conditions.

9. The hydroformylated thermal oil according to claim 1 wherein the solvent is selected from the group consisting of saturated hydrocarbons, aromatic hydrocarbons, ethers, fluorinated hydrocarbons, and sulfones.

10. The hydroformylated thermal oil according to claim 1 wherein the solvent is selected from the group consisting of hexane, octane, dodecane, naphtha, decalin, tetrahydronaphthalene, kerosene, mineral oil, cyclohexane, cycloheptane, alkylcycloalkane, benzene, toluene, xylene, alkyl-naphthalene, tetrahydrofuran, tetrahydropyran, diethylether, 1,2-dimethoxybenzene, 1,2-diethoxybenzene, the mono- and dialkylethers of ethylene glycol, the mono- and dialkylethers of propylene glycol, the mono- and dialkylethers of butylene glycol, the mono- and dialkylethers of diethylene glycol, the mono- and dialkylethers of dipropylene glycol, the mono- and dialkylethers of oxyethyleneoxypropylene glycol, perfluoroethane, monofluorobenzene, dimethylsulfone, diethylsulfone, diphenylsulfone and sulfolane.

11. The hydroformylated thermal oil according to claim 1 wherein said decarboxylated rosin acid has an acid number of from 4 to about 36.

12. The hydroformylated thermal oil according to claim 1 wherein the reaction is conducted at a temperature ranging from about 50° C. to about 400° C.

13. A process for preparing rubber compositions which comprises admixing a rubber selected from the group consisting of natural rubber, homopolymers of conjugated diolefins copolymers of conjugated diolefins and ethylenically unsaturated monomers or mixtures thereof with a hydroformylated thermal oil prepared according to a process comprising reacting decarboxylated rosin acid having an acid number ranging from about 2 to about 62 with carbon monoxide and hydrogen under hydroformylation conditions in the presence of a hydroformylation catalyst and organic reaction solvent for a time sufficient until from about 0.1% to 5% of the decarboxylated rosin acid is functionalized.

14. A process for preparing rubber compositions according to claim 14 wherein the hydroformylated thermal oil is at a concentration of from about 2 parts per hundred rubber to 50 parts per hundred rubber and is in an intimate mixture with said rubber.

15. A rubber composition which comprises (1) a rubber selected from the group consisting of natural rubber, homopolymers of conjugated diolefins and copolymers of conjugated diolefins, ethylenically unsaturated monomers or mixtures thereof and (2) a hydroformylated thermal oil prepared according to a process comprising reacting decarboxylated rosin acid having an acid number ranging from about 2 to about 62 with carbon monoxide and hydrogen under hydroformylation conditions in the presence of a hydroformylation catalyst and organic solvent for a time sufficient until from about 0.1% to 5% of the decarboxylated rosin acid is functionalized.

16. The rubber composition of claim 15 wherein the rubber is selected from the group consisting of natural rubber, polybutadiene, SBR, polyisoprene or mixtures thereof.

17. The rubber composition of claim 16 wherein said oil is at a concentration of from about 20 parts per hundred rubber to 50 parts per hundred rubber.

18. The rubber composition of claim 17 wherein said oil is at a concentration of from about 5 parts per hundred rubber to 35 parts per hundred rubber.

* * * * *